(12) United States Patent
Choi (10) Patent No.: US 7,956,968 B2
(45) Date of Patent: Jun. 7, 2011

(54) LIQUID CRYSTAL DISPLAY DEVICE AND FABRICATION METHOD THEREOF

(75) Inventor: Su Seok Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 439 days.

(21) Appl. No.: 11/014,831

(22) Filed: Dec. 20, 2004

(65) Prior Publication Data

US 2005/0140884 A1    Jun. 30, 2005

(30) Foreign Application Priority Data

Dec. 30, 2003  (KR) .................. 10-2003-0099506

(51) Int. Cl.
*G02F 1/1337* (2006.01)

(52) U.S. Cl. ........................................... 349/123
(58) Field of Classification Search .................. 349/127
See application file for complete search history.

(56) References Cited

U.S. PATENT DOCUMENTS

| | | | |
|---|---|---|---|
| 4,490,015 A | 12/1984 | Kawarada et al. | |
| 4,983,318 A | 1/1991 | Matsumoto et al. | |
| 5,039,208 A | 8/1991 | Ohnishi et al. | |
| 5,119,221 A | 6/1992 | Nakajima et al. | |
| 5,186,986 A * | 2/1993 | Ogawa | 428/1.23 |
| 5,258,134 A | 11/1993 | Yoshinaga et al. | |
| 5,617,228 A * | 4/1997 | Watanabe et al. | 349/19 |
| 5,644,416 A * | 7/1997 | Morikawa et al. | 349/86 |
| 5,745,629 A | 4/1998 | Sasaki | |
| 5,925,423 A | 7/1999 | Han et al. | |
| 6,048,928 A | 4/2000 | Yu et al. | |
| 6,417,907 B2 | 7/2002 | Choi et al. | |
| 6,570,637 B2 | 5/2003 | Choi et al. | |
| 6,582,862 B1 * | 6/2003 | Nakamura et al. | 430/7 |
| 6,985,200 B2 * | 1/2006 | Miyachi et al. | 349/127 |
| 2002/0171802 A1 * | 11/2002 | Wang | 349/187 |

OTHER PUBLICATIONS

"7th International Conference on Ferroelectric Liquid Crystals"; Aug. 29, 1999-Sep. 3, 1999; Darmstadt University of Technology Germany.

* cited by examiner

*Primary Examiner* — Lucy P Chien
(74) *Attorney, Agent, or Firm* — McKenna Long & Aldridge LLP (57) ABSTRACT

An LCD device including first and second substrates that face each other; a liquid crystal layer between the first and second substrates; first alignment layers are on the first and second substrate; and a second alignment layer on at least one of the first and second substrates. The second alignment layer is based on a CDR (continuous director rotation) mode liquid crystal.

20 Claims, 9 Drawing Sheets

LIQUID CRYSTAL DISPLAY DEVICE AND FABRICATION METHOD THEREOF

This application claims the benefit of Korean Patent Application No. 99506/2003, filed on Dec. 30, 2003, which is hereby incorporated by reference for all purposes as if fully set forth herein.

BACKGROUND OF THE INVENTION

1. Field of the Invention

The present invention relates to a liquid crystal display device (LCD) and a fabrication method thereof.

2. Discussion of the Related Art

As the active matrix LCD (AM-LCD) has rapidly developed in its performance, such an AM-LCD is being widely used in a flat panel television (TV), a portable computer, a large information monitor and the like.

A twisted nematic mode (TN)-LCD is generally known as one type of AM-LCDs. In the TN-mode, an electrode is formed on each of two substrates, liquid crystal directors are arranged in such a way that they are twisted by 90°, and then a voltage is applied to the electrodes to drive the liquid crystal directors.

However, the TN-LCD is fundamentally problematic in that its viewing angle is narrow and a slow response characteristic is shown in its gray scale operation.

Accordingly, research has been performed to solve the aforementioned problems of the TN-LCD.

As a result of the research, an in-plane switching mode (IPS mode) LCD has been developed. In the IPS-mode LCD, two electrodes are formed on one substrate and an electrical field is generated in a horizontal direction with respect to the substrate by applying a voltage between the electrodes, thereby twisting liquid crystal directors in a plane parallel to an alignment layer.

The related art IPS-mode LCD will now be described with reference to FIGS. 1 through 3.

Figure 1:
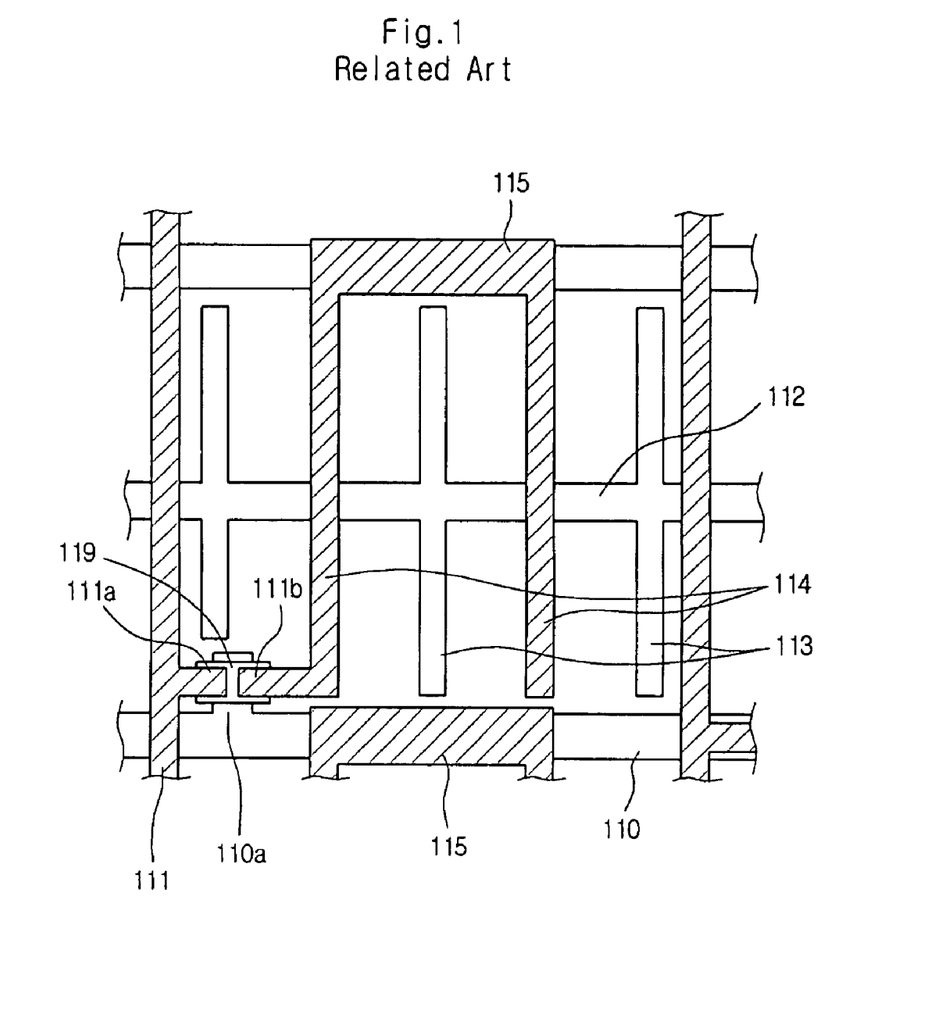
FIG. 1 is a plan view of a related art IPS-mode LCD.
Figure 2:
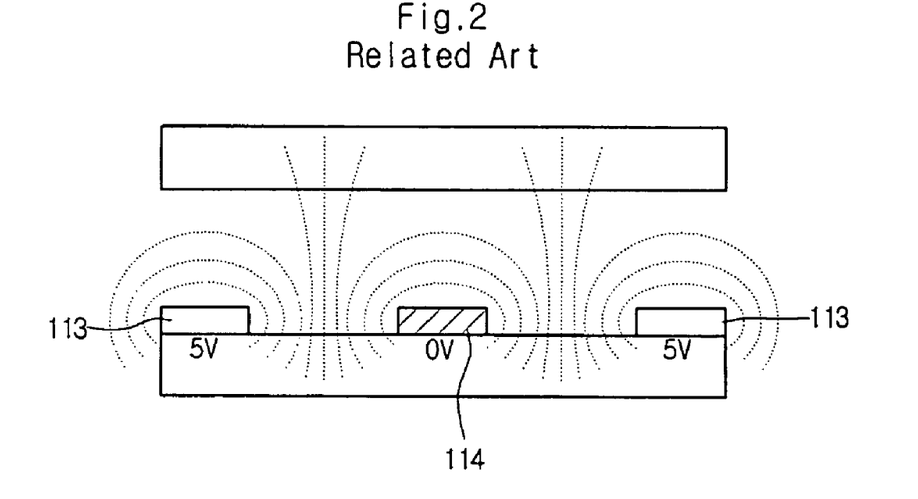
FIG. 2 illustrates a voltage distribution in the related art IPS-mode LCD.
Figure 3A:
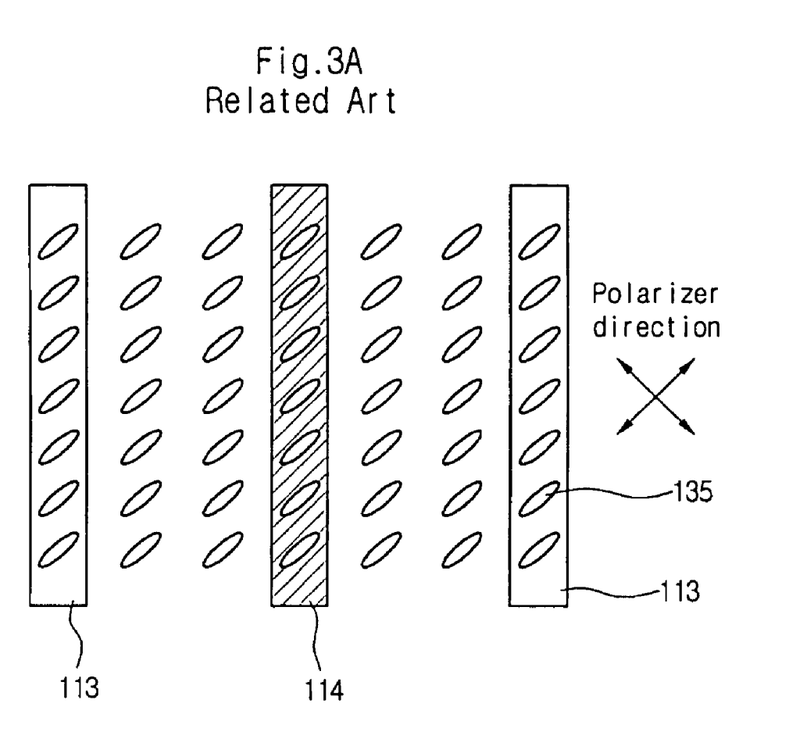
FIG. 3A is a plan view of the related art IPS-mode LCD when a voltage is not applied.
Figure 3B:
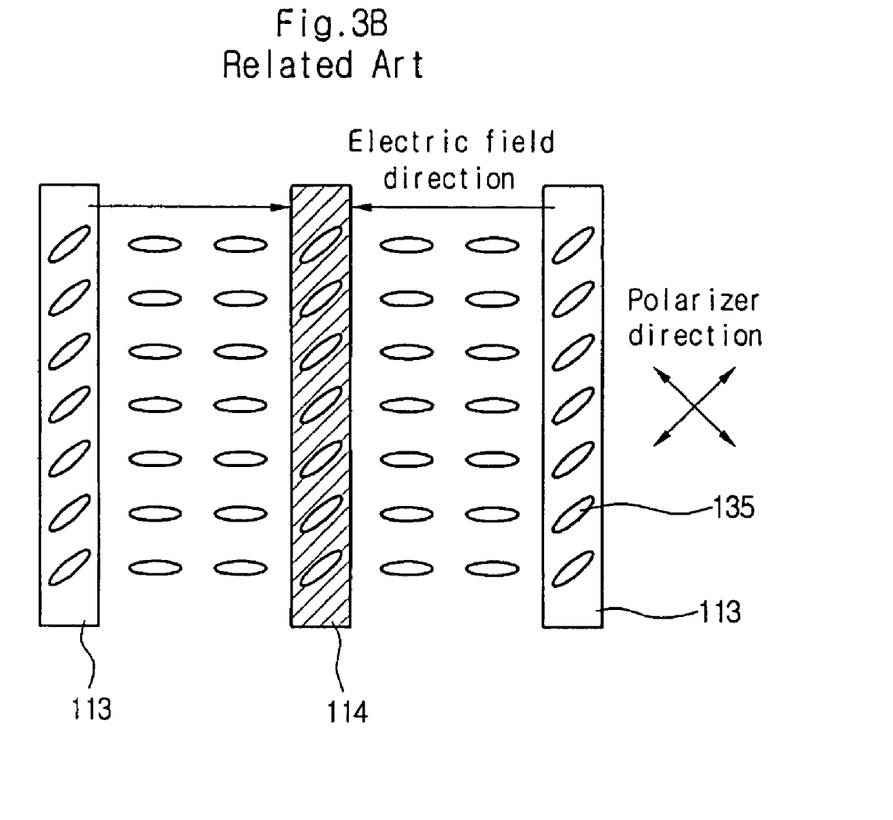
FIG. 3B is a plan view of the related art IPS-mode LCD when a voltage is applied.

FIG. 1 is a plan view of the IPS-mode LCD, FIG. 2 is a view illustrating a voltage distribution in the IPS-mode LCD, FIG. 3A is a plan view of the IPS-mode LCD when a voltage is not applied, and FIG. 3B is a plan view of the IPS-mode LCD to when a voltage is applied.

The IPS-mode LCD is constructed to include first and second substrates facing each other and a liquid crystal layer formed therebetween, a black matrix for preventing light leakage is formed on the first substrate, a RGB color filter layer for reproducing a color is formed on the black matrix, and an over coat layer is formed for protecting the RGB color filter layer.

In FIG. 1, the second substrate includes thereon gate lines 110 and data lines 111 crossing each other to define pixel regions. Each pixel region includes a common line 112 arranged to be parallel to the gate lines 110, a thin film transistor (TFT) arranged near a crossing of the gate line 110 and the data line 111, common electrodes 113 extended from the common line 112 and parallel to the data lines 111, and pixel electrodes 114 connected to the TFT and arranged between and parallel to the common electrodes 113. Also, storage electrodes 115 are extended from the pixel electrodes 114 and are formed on the gate lines 110, and a passivation layer (not shown) is formed on a front surface including the data lines 111 to protect patterns on the second substrate.

A gate-line layer and a data-line layer are isolated from each other by a gate insulation layer (not shown) having an excellent insulation property and interposed therebetween. Also, the common line 112 and the common electrodes 113 are formed together with the gate lines 110, and the pixel electrodes 114 are formed together with the data lines 111. Here, the gate lines 110 and the data lines 111 are made of a low-resistance metal.

Also, the common electrodes 113 and the pixel electrodes 114 may either be formed on different planes between which an insulation layer is interposed, as above, or may also be formed on the same plane unless an electrical short occurs between the common electrodes 113 and the pixel electrodes 114.

The TFT is constructed to include a gate electrode 110A extended from the gate line 110, a gate insulation layer, an active layer 119 having a channel region, and a source electrode 111A and a drain electrode 111B extended from the data line 111.

In the above-described IPS-MODE LCD, if a voltage of 5V is applied to the common electrodes 113 and a voltage of 0V is applied to the pixel electrodes 114, then equipotential surfaces are horizontally distributed over the electrodes 113 and 114 and equipotential surfaces are nearly vertically distributed between the electrodes 113 and 114 as shown in FIG. 2.

Accordingly, because an electric field direction is perpendicular to an equipotential surface, a horizontal electric field rather than a vertical electrical field is formed between the electrodes 113 and 114, a vertical electric field is formed over the electrodes 113 and 114, and horizontal and vertical electric fields are formed around edges of the electrodes 113 and 114.

By using such electric fields, the IPS-MODE LCD adjusts an arrangement of a liquid crystal.

If a sufficient voltage is applied to liquid crystal molecules 135 initially aligned in a direction identical to that of a transmittance axis of a polarizer as shown in FIG. 3A, then major axes of the liquid crystal molecules 135 are arranged in parallel to the resulting electric field as shown in FIG. 3B.

Here, if a dielectric anisotropy f the liquid crystal is negative, then shorter axes of the liquid crystal molecules are arranged in parallel to the resulting electric field.

Specifically, if first and second polarizers respectively attached on outer surfaces of the first and second substrates are arranged in such a way that their transmittance axes are perpendicular to each other, and if an alignment layer formed on the first substrate is rubbed parallel to a transmittance axis of one of the two polarizers, then the liquid crystal becomes a normally black (NB) mode.

That is, if a voltage is not applied to a corresponding element, then the liquid crystal molecules 135 are arranged as shown in FIG. 3A, thereby expressing a black state. Otherwise, if a voltage is applied to a corresponding element, then the liquid crystal molecules 135 are arranged parallel to the resulting electric field as shown in FIG. 3B, thereby expressing a white state.

In FIGS. 3A and 3B, reference numerals 113 and 114 indicate a common electrode and a pixel electrode, respectively.

However, the above related art IPS-MODE LCD has slow response characteristics and low light transmittance.

SUMMARY OF THE INVENTION

Accordingly, the present invention is directed to a liquid crystal display device and a fabrication method thereof that substantially obviates one or more problems due to limitations and disadvantages of the related art.

An advantage of the present invention is to provide an LCD having an excellent image quality and light efficiency, and a fabrication method thereof.

Additional features and advantages of the invention will be set forth in the description which follows, and in part will become apparent from the description, or may be learned by practice of the invention. The features and advantages of the invention may be realized and attained by the structure particularly pointed out in the written description and claims hereof as well as the appended drawings.

To achieve these and other advantages and in accordance with the purpose of the invention, as embodied and broadly described herein, there is provided a LCD device including: first and second substrates facing each other; a liquid crystal layer between the first and second substrates; first alignment layers on the first and second substrates; and a CDR (continuous director rotation) mode liquid crystal-based second alignment layer on at least one of the first and second substrates.

In another aspect of the present invention, there is provided an LCD device including: a substrate; a first alignment layer formed on the substrate; and a CDR mode liquid crystal-based second alignment layer formed on the first alignment layer.

In a further aspect of the present invention, there is provided a method of fabricating an LCD device. The method includes: forming first alignment layers on first and second substrates; forming a CDR mode liquid crystal-based second alignment layer on at least one of the first and second substrates; and forming a liquid crystal layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

The present invention uses a continuous director rotation (CDR) mode of ferroelectric liquid crystals (FLCs) as a dynamic alignment layer. Contrary to FLCs in general, the CDR mode liquid crystal exhibits a SmC* (smectic C phase)– N* (chiral nematic phase)–Isotropic phase) in a monomer state without SmA* (smectic A phase).

The above CDR mode liquid crystal does not have a bistable structure, but instead has a monostable structure to thereby enable an analog gray scale.

In a case where ferroelectric liquid crystal molecules of the CDR mode liquid crystal are aligned by a negative voltage (–V), if a positive voltage (+V) is applied to the aligned ferroelectric liquid crystal molecules, the CDR mode liquid crystal then converts a polarization direction of an incident light by 90° to thereby permit the incident light to be transmitted therethrough. Otherwise, if a negative voltage (–V) is applied to the aligned ferroelectric liquid crystal molecules, the CDR mode liquid crystal then maintains a polarization direction of an incident light by 90° to thereby intercept the incident light.

The light transmittance of the CDR mode liquid crystal is proportional to a strength of the applied positive voltage, wherein the light transmittance maintains its maximum value if the strength is identical to or above a threshold value.

On the contrary, in case where ferroelectric liquid crystal molecules of the CDR mode liquid crystal are aligned by a positive voltage (+V), if a negative voltage (–V) is applied to the aligned ferroelectric liquid crystal molecules, the CDR mode liquid crystal then permits an incident light to be transmitted therethrough. Otherwise, if a positive voltage (+V) is applied to the aligned ferroelectric liquid crystal molecules, the CDR mode liquid crystal intercepts the incident light.

It is possible to modify a quality of the CDR mode liquid crystal by replacing its terminal group with a double bond group, thereby enabling its photo-curing reaction.

The above-modified CDR mode liquid crystal fundamentally maintains a characteristic of a CDR mode liquid crystal in a monomer state. Therefore, when the modified CDR mode liquid crystal is used as a dynamic surface alignment layer, various gray scale reproduction is possible and light efficiency can be enhanced.

Figure 4:
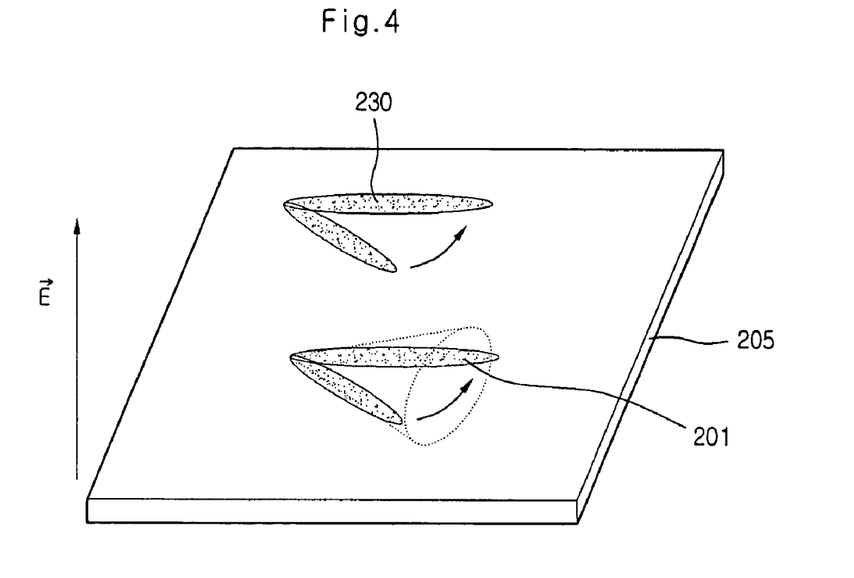
FIG. 4 is a view illustrating a characteristic of an aligned CDR mode liquid crystal when an alignment layer is formed by a CDR mode liquid crystal of a LCD according to an embodiment of the present invention.

FIG. 4 is a view illustrating a characteristic of an aligned CDR mode liquid crystal when an alignment layer is formed using a CDR mode liquid crystal in the LCD according to an embodiment of the present invention.

In FIG. 4, a CDR mode liquid crystal 201 is fundamentally high in its light efficiency and has a monostable structure as described previously to thereby enable an analog gray scale; thus, enabling various gray scale reproduction.

It is possible to form a regular alignment state of a monomer (a monostable structure) by forming the CDR mode liquid crystal 201 on an alignment layer and then applying a proper voltage to the liquid crystal 201 at about a phase transition temperature between an N* (chiral nematic phase) and an SmC* (chiral smectic C phase).

Photo-curing of the resulting CDR mode liquid crystal 201 by irradiation of a UV (ultraviolet) results in the formation of a polymer network.

The photo-curing of the resulting CDR mode liquid crystal 201 is done by replacing a terminal group of the CDR mode liquid crystal 201 with a double bond group so that a photo-curing reaction of the CDR mode liquid crystal 201 is possible.

In a case where a dynamic alignment layer using the CDR mode liquid crystal 201 is used, a light transmittance T is expressed as the following Equation (1).

$$T=\sin^2(\pi d\Delta n)/\lambda \cdot \sin^2 2\theta \qquad (1)$$

Here, the light transmittance T depends on a tilt angle θ caused by application of a first polarity voltage.

At this time, the CDR mode liquid crystal 201 is initially positioned at an end of a cone expressed by a dotted line as shown in FIG. 4. When the tilt (i.e. rotation) angle θ exceeds 22.50 and then becomes 45°, the light transmittance T can be maximized.

Here, the tilt (rotation) angle may be determined to be about 20° through 25°.

At this time, the CDR mode liquid crystal 201 is continuously phase-changed (Crystal phase–SmC*–N*–Isotropic phase) in a monomer state, whereby a liquid crystal initially aligned by a vertical electric field continuously rotates its direction, thereby enabling intermediate gray scale reproduction.

That is, the LCD according to the present invention drives a liquid crystal 230 on a surface by applying a voltage to upper and lower electrodes (not shown), thereby converting an incident light.

The CDR mode liquid crystal 201 is driven substantially on a surface while rotating around an imaginary cone, thereby inducing the neighboring liquid crystal 230 to be driven on a surface.

When an electric field is applied to the CDR mode liquid crystal 201, the CDR mode liquid crystal 201 is permanently (i.e. spontaneously) polarized and is thus rapidly rotated due to an interaction between the electric field and the spontaneous polarization (similar to an interaction between magnets).

Figure 5A:
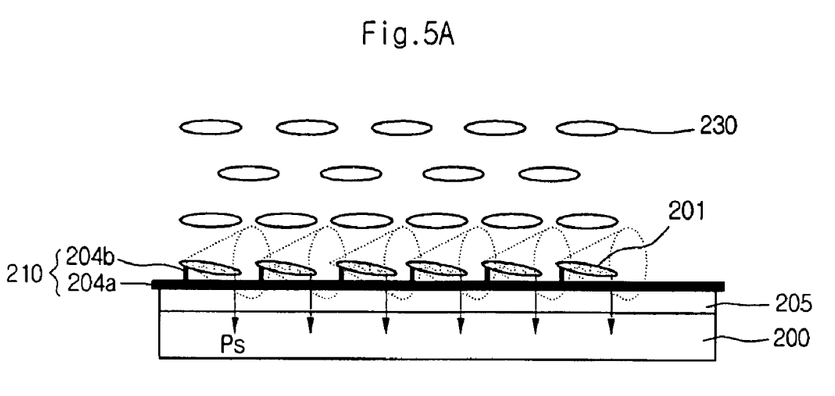
FIGS. 5A through 5C are views illustrating characteristics of a liquid crystal according the types of alignment layers in the LCD according to an embodiment of the present invention.
Figure 5B:
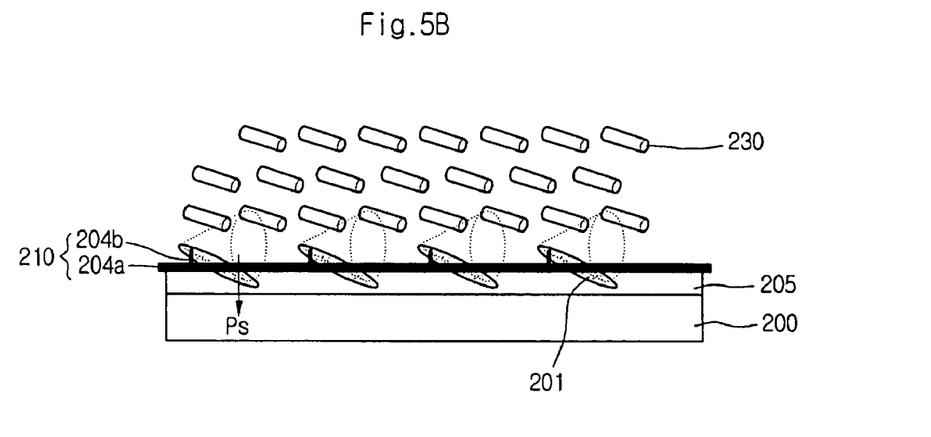
Figure 5C:
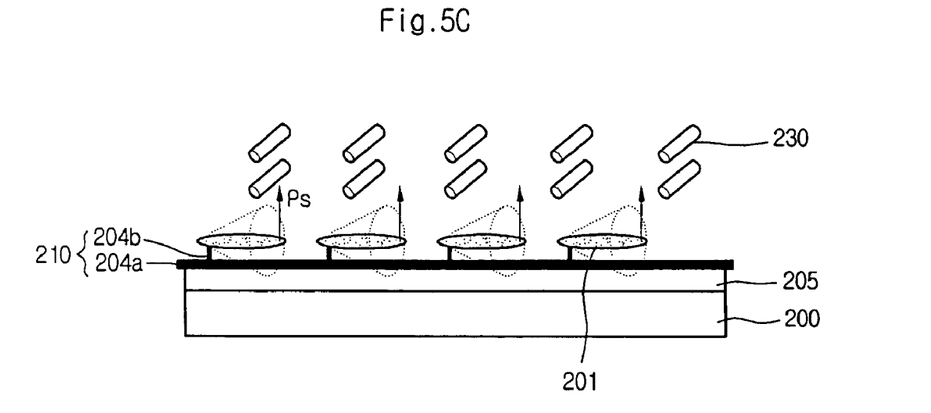

FIGS. 5A through 5C are views illustrating liquid crystal on a dynamic alignment layer of a LCD according to an embodiment of the present invention.

In FIG. 5A, the LCD includes a substrate 200, a first alignment layer 205 and a second alignment layer 210 formed on the substrate 200. Here, the first alignment layer 205 is a passive alignment layer, and the second alignment layer 210 is a dynamic alignment layer.

The second alignment layer 210 may be formed by modifying the CDR mode liquid crystal 201 so that a photo-curing reaction of the CDR mode liquid crystal 201 is possible. The second alignment layer 210 includes a main chain 204A and a side chain 204B made from a high molecular material. The side chain 204B is extended from the side of the main chain 204A, thereby taking the form of a side branch.

The side chain 204B may vary on a plane substantially parallel to a surface of the second alignment layer 210 based upon an applied electric field. That is, the side chain 204B moves on a plane substantially parallel to a surface of the second alignment layer 210 based upon the strength of the applied electric field.

The present invention modifies the CDR mode liquid crystal 201 by replacing the side chain 204B of the CDR mode liquid crystal 201 with a double bond group and then forms the modified CDR mode liquid crystal 201 on the first alignment layer 205. The first alignment layer may be formed of a polyimide, for example.

The CDR mode liquid crystal 201 is then photo-cured by irradiating an ultraviolet (UV) light on the CDR mode liquid crystal 201 while maintaining its normal alignment state of a monomer. Thus, the second alignment layer 210 is formed which is a CDR mode liquid crystal alignment layer that forms a polymer network.

At this time, if a liquid crystal is initially aligned on the second alignment layer 210, the CDR mode liquid crystal 201 is aligned on the second alignment layer 210 substantially parallel to the substrate.

Here, an arrangement state of the CDR mode liquid crystal 201 takes the form of an initial arrangement through a phase transition from the N* to the SmC* (N*→SmC*) when a electric field is not applied.

That is, the CDR mode liquid crystal 210 is initially aligned by applying a DC electric field between the upper and lower substrates during a phase transition process from the N* to the SmC* caused by a change in a temperature.

Specifically, if a negative electric field is applied to the substrate 200 during a phase transition process from the N* to the SmC*, the CDR mode liquid crystal 201 is spontaneously polarized and the spontaneous polarization (Ps) is directed to the applied electric field. Accordingly, the spontaneous polarization of the CDR mode liquid crystal 201 is directed to the substrate 200 to thereby be monostable as shown in FIG. 5A.

As shown in FIG. 5B and 5C, if a positive electric field is applied to the substrate 200, the CDR mode liquid crystal 201 of the second alignment layer 210 continuously rotates around a cone, thereby enabling an intermediate gray scale reproduction.

Figure 6:
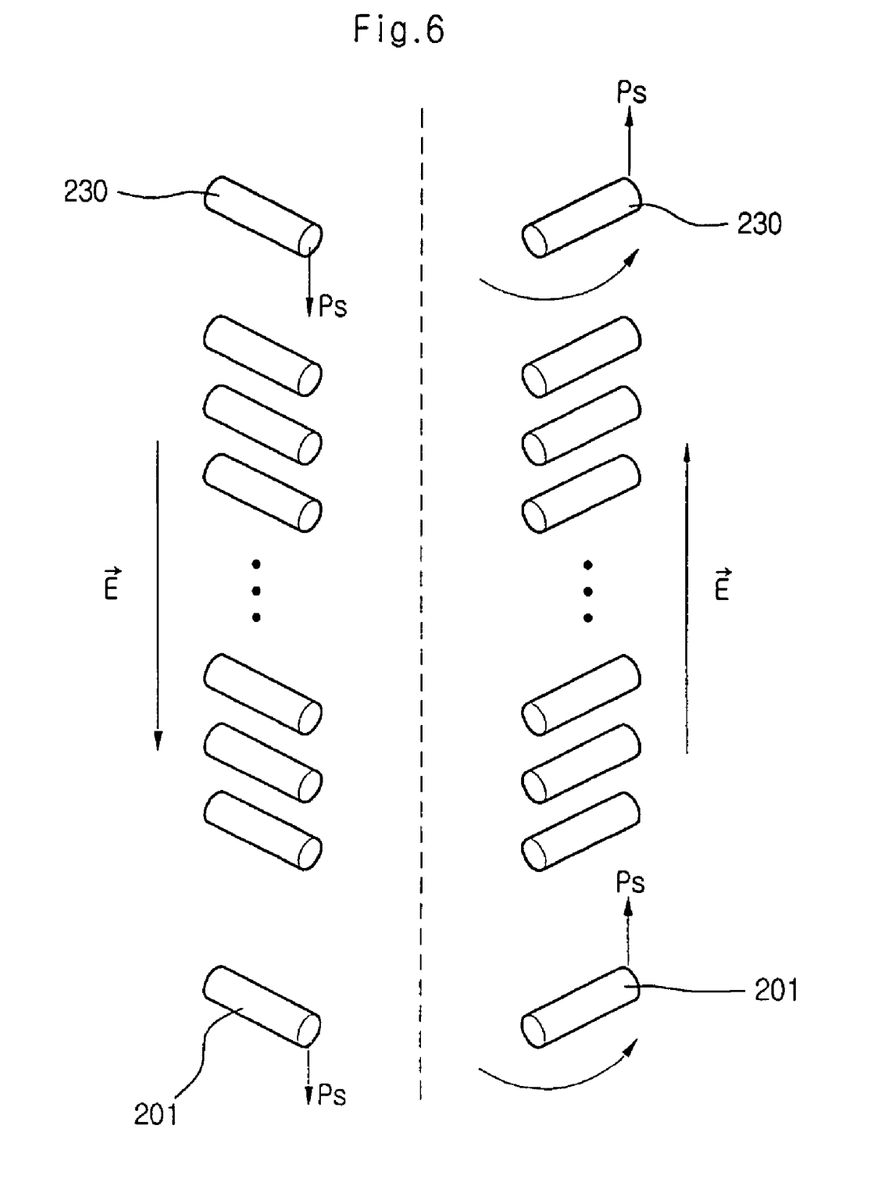
FIG. 6 is a view illustrating an alignment characteristic of a liquid crystal in an LCD according to an embodiment of the present invention.

FIG. 6 illustrates an alignment of a liquid crystal in the LCD according to an embodiment of the present invention.

In FIG. 6, when an electric field different from a polarity aligned during the phase transition process from the N* to the SmC* is applied to the CDR mode liquid crystal 201 of the second alignment layer 210, a spontaneous polarization Ps of the CDR mode liquid crystal 210 varies its direction. Thus, the CDR mode liquid crystal 210 is driven within a surface, thereby inducing the neighboring liquid crystal 230 to be driven within a surface.

The liquid crystal 230 is phase-isolated from the CDR mode liquid crystal 201 that is an FLC, whereby an interface is formed between the two crystals 201 and 203.

As stated above, if the liquid crystal 230 is aligned using the second alignment layer 210, the liquid crystal 230 then switches on a plane substantially parallel to the substrate 200 to thereby enhance a viewing angle property, and exhibits a quick response time of several micro-seconds (μs) to several milli-seconds (ms) due to an inverse switching caused by a spontaneous polarization Ps.

The liquid crystal 230 may be a nematic liquid crystal and may be formed from a negative material (dielectric anisotropy is a negative) or a positive material. At this time, a negative liquid crystal is less affected than a positive liquid crystal when an electric field is applied.

As described the LCD and fabrication method thereof according to the present invention modifies a CDR mode liquid crystal so that a photo-curing reaction is possible and uses the modified CDR mode liquid crystal, which fundamentally maintains a characteristic of a CDR mode liquid crystal in a monomer state, as a dynamic alignment layer, thereby making it possible to realize a high light transmittance and a large viewing angle.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An LCD device, comprising:
   first and second substrates facing each other;

a liquid crystal layer between the first and second substrates;
first alignment layers on the first and second substrates; and
a CDR (continuous director rotation) mode liquid crystal-based second alignment layer on at least one of the first and second substrates,
wherein the CDR mode liquid crystal continuously rotates like a cone form based upon an applied electric field, a range of the rotation angle of the CDR mode liquid crystal is about 0° through 45° and the CDR mode liquid crystal is driven substantially on a surface while rotating around the cone,
wherein the second alignment layer includes a main chain formed on the first alignment layer and a side chain branched from the main chain and combined with the CDR mode liquid crystal,
wherein the second alignment layer is photo-cured during an initial alignment to form a polymer network,
wherein the side chain moves on a plane substantially parallel to a surface of the second alignment layer,
wherein the CDR mode liquid crystal is initially aligned on the second alignment layer substantially parallel to the substrate,
wherein the CDR mode liquid crystal is adjacent to the liquid crystal layer and induces the liquid crystal layer to be driven on a surface,
wherein a terminal group of the CDR mode liquid crystal is combined with the side chain,
wherein the CDR mode liquid crystal continuously rotates on the terminal group.

2. The LCD device according to claim 1, wherein an electric field is vertically applied to the first and second substrates.

3. The LCD device according to claim 1, wherein the first alignment layers are formed of a polyimide.

4. The LCD device according to claim 1, wherein the liquid crystal layer is a negative liquid crystal.

5. The LCD device according to claim 1, wherein a phase transition of the CDR mode liquid crystal includes from an isotropic phase to a chiral smectic C phase.

6. The LCD device according to claim 5, wherein the phase transition of the CDR mode liquid crystal further includes a chiral nematic phase between the isotropic phase and the chiral smectic C phase.

7. The LCD device according to claim 1, wherein a phase transition of the CDR mode liquid crystal includes a first phase transition from an isotropic phase to a chiral nematic phase and a second phase transition from the chiral nematic phase to the chiral smectic C phase.

8. A method of fabricating an LCD device, the method comprising:
forming first alignment layers on first and second substrates;
forming a CDR mode liquid crystal-based second alignment layer on at least one of the first and second substrates, wherein the CDR mode liquid crystal continuously rotates like a cone form based upon an applied electric field, a range of the rotation angle of the CDR mode liquid crystal is about 0° through 45° and the CDR mode liquid crystal is driven substantially on a surface while rotating around the cone,
wherein the second alignment layer includes a main chain formed on the first alignment layer and a side chain branched from the main chain and combined with the CDR mode liquid crystal; and
forming a liquid crystal layer between the first and second substrates,
wherein forming the second alignment layer comprises:
replacing molecules of the CDR mode liquid crystal and modifying the CDR mode liquid crystal by replacing a terminal group of the CDR mode liquid crystal with double bond group to be photo-curable; forming the modified CDR mode liquid crystal on at least one of the first and second substrates; and photo-curing the CDR mode liquid crystal while maintaining a normal alignment state of the CDR mode liquid crystal,
wherein the side chain moves on a plane substantially parallel to a surface of the second alignment layer,
wherein the CDR mode liquid crystal is initially aligned on the second alignment layer substantially parallel to the substrate,
wherein the CDR mode liquid crystal is adjacent to the liquid crystal layer and induces the liquid crystal layer to be driven on a surface,
wherein the CDR mode liquid crystal continuously rotates on the terminal group.

9. The method according to claim 8, wherein the first alignment layers are formed of a polyimide.

10. The method according to claim 8, wherein the liquid crystal layer is a negative liquid crystal.

11. The method according to claim 8, wherein a phase transition of the CDR mode liquid crystal includes from an isotropic phase to a chiral smectic C phase.

12. The method according to claim 11, wherein the phase transition of the CDR mode liquid crystal further includes a chiral nematic phase between the isotropic phase and the chiral smectic C phase.

13. The method according to claim 8, wherein a phase transition of the CDR mode liquid crystal includes a first phase transition from an isotropic phase to a chiral nematic phase and a second phase transition from the chiral nematic phase to the chiral smectic C phase.

14. An LCD device comprising:
a substrate;
a first alignment layer on the substrate; and
a CDR mode liquid crystal-based second alignment layer formed on the first alignment layer,
wherein the CDR mode liquid crystal continuously rotates like a cone form based upon an applied electric field, a range of the rotation angle of the CDR mode liquid crystal is about 0° through 45° and the CDR mode liquid crystal is driven substantially on a surface while rotating around the cone,
wherein the second alignment layer includes a main chain formed on the first alignment layer and a side chain branched from the main chain and combined with the CDR mode liquid crystal,
wherein the second alignment layer is photo-cured during an initial alignment to form a polymer network,
wherein the side chain moves on a plane substantially parallel to a surface of the second alignment layer,
wherein the CDR mode liquid crystal is initially aligned on the second alignment layer substantially parallel to the substrate,
wherein the CDR mode liquid crystal is adjacent to the liquid crystal layer and induces the liquid crystal layer to be driven on a surface,
wherein a terminal group of the CDR mode liquid crystal is combined with the side chain,
wherein the CDR mode liquid crystal continuously rotates on the terminal group.

15. The LCD device according to claim 14, wherein the first alignment layer is formed of a polyimide.

16. The LCD device according to claim 14, wherein a phase transition of the CDR mode liquid crystal includes from an isotropic phase to a chiral smectic C phase.

17. The LCD device according to claim 16, wherein the phase transition of the CDR mode liquid crystal further includes a chiral nematic phase between the isotropic phase and the chiral smectic C phase.

18. The LCD device according to claim 14, wherein a phase transition of the CDR mode liquid crystal includes a first phase transition from an isotropic phase to a chiral nematic phase and a second phase transition from the chiral nematic phase to the chiral smectic C phase.

19. The LCD device according to claim 1, wherein the side chain moves on a plane substantially parallel to a surface of the second alignment layer.

20. The LCD device according to claim 1, wherein the CDR mode liquid crystal is initially aligned on the second alignment layer substantially parallel to the substrate.

* * * * *